Dec. 7, 1937.   H. SANDLANT   2,101,599
HOLDING AND SERVING MACHINE FOR ICE CREAM OR THE LIKE
Filed Dec. 1, 1936   3 Sheets-Sheet 1
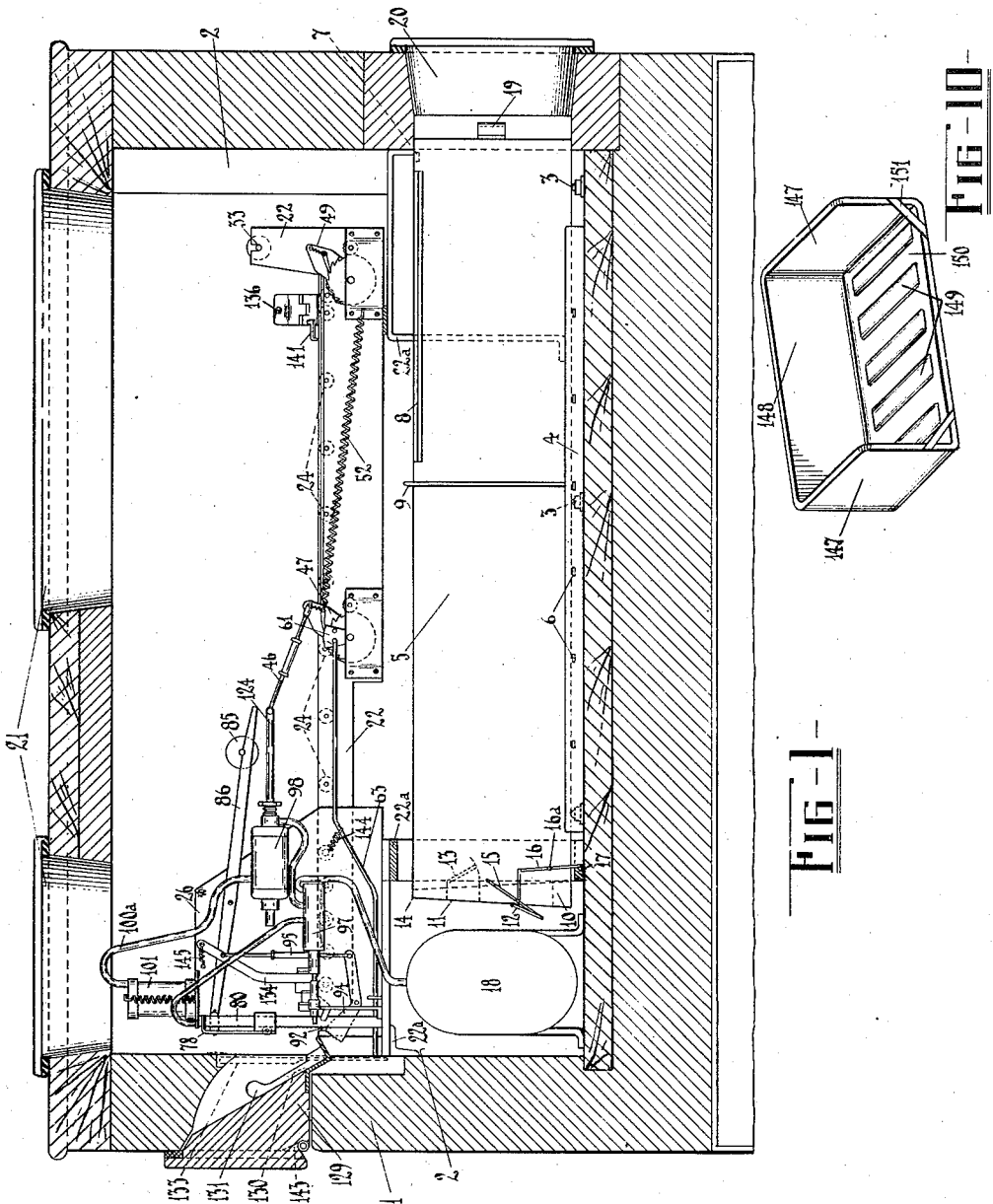
H. Sandlant
Inventor
By: Glascock Downing & Seebold
Attys Dec. 7, 1937.     H. SANDLANT     2,101,599
HOLDING AND SERVING MACHINE FOR ICE CREAM OR THE LIKE
Filed Dec. 1, 1936     3 Sheets-Sheet 2
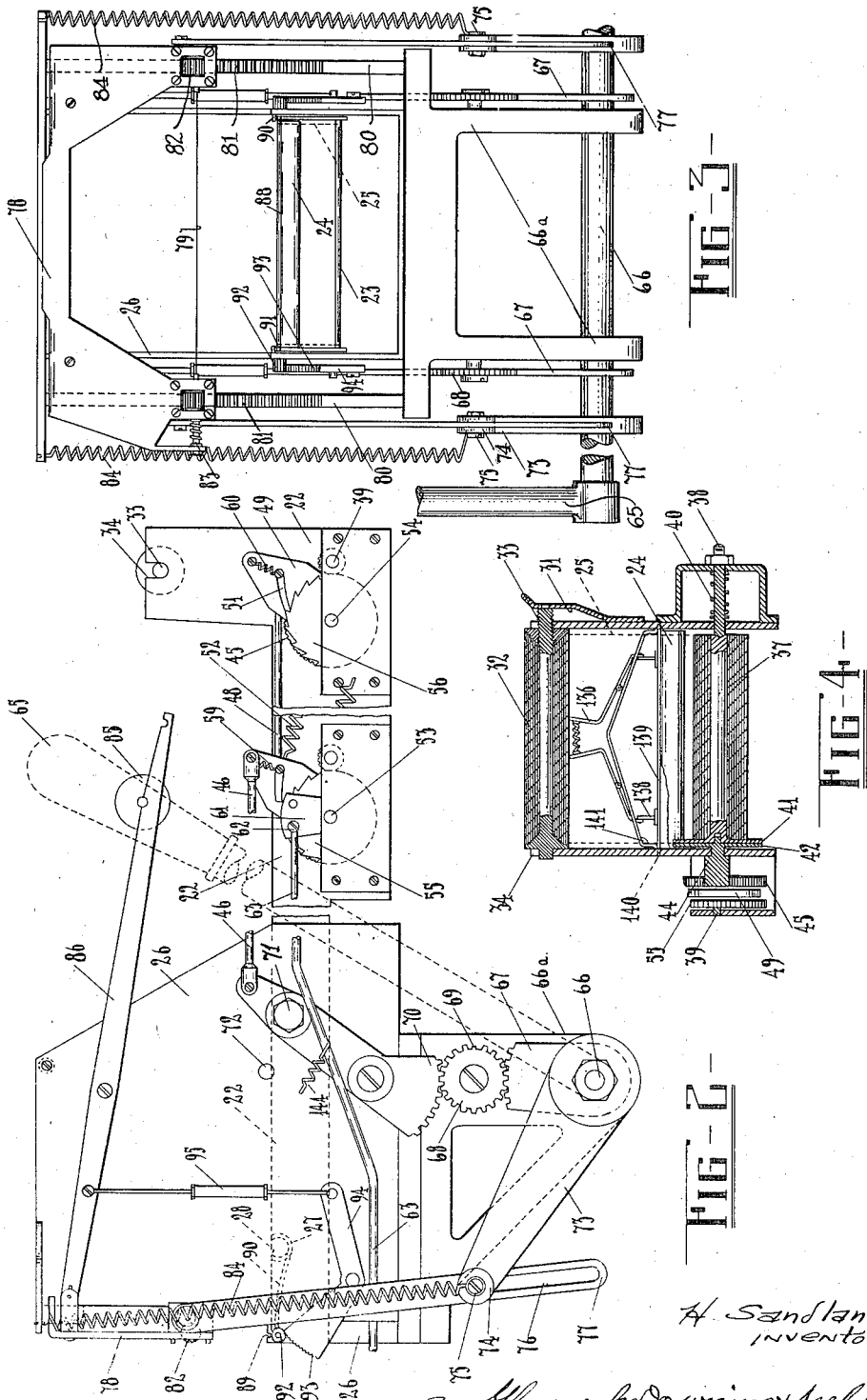
H. Sandlant
INVENTOR
By Glascock Downing & Seebold
Attys.

Dec. 7, 1937.  H. SANDLANT  2,101,599
HOLDING AND SERVING MACHINE FOR ICE CREAM OR THE LIKE
Filed Dec. 1, 1936  3 Sheets-Sheet 3
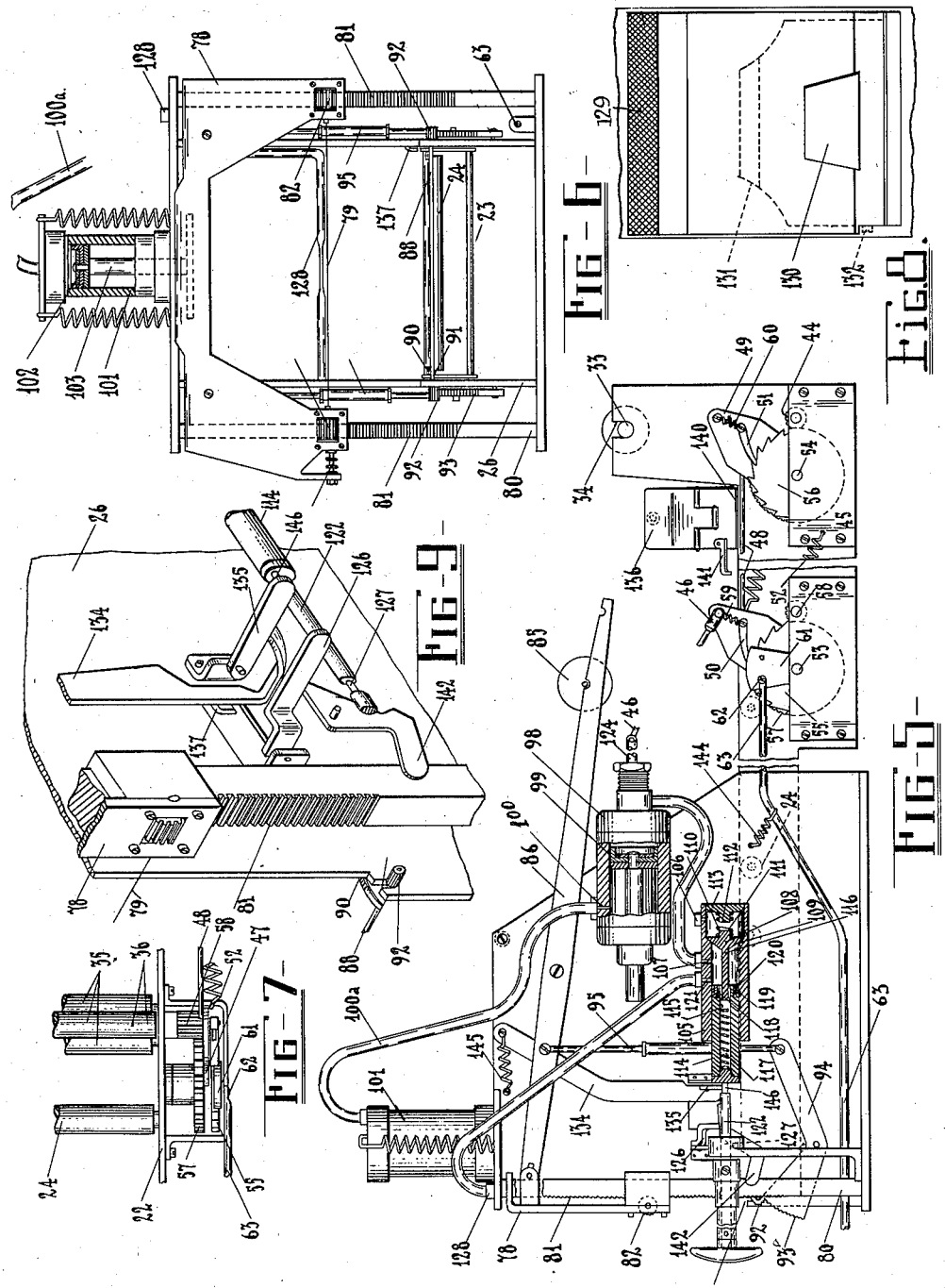
H. Sandlant
INVENTOR
By Glascock Downing & Seebold
Attys.

Patented Dec. 7, 1937

2,101,599

UNITED STATES PATENT OFFICE 2,101,599

HOLDING AND SERVING MACHINE FOR ICE CREAM OR THE LIKE

Harry Sandlant, Wellington, New Zealand

Application December 1, 1936, Serial No. 113,735
In New Zealand November 28, 1935

19 Claims.  (Cl. 107—21)

The invention relates to machines for holding and serving ice-cream or the like in the required predetermined quantities without detrimentally lowering the temperature of the holder.

It is well known that ice-cream or the like deteriorates rapidly when exposed to varying degrees of temperature, even when such temperatures vary merely between 15 degrees Fahr. and 25 degrees Fahr.; particularly is this so when contact occurs with foreign mater of a higher temperature. Furthermore ice-cream, like whipped cream in manufacture, is subjected to aeration and known in the trade as "swell" or "overrun" and this desirable condition of the product is quickly destroyed by compression and thus consolidation due to disturbance by excessive handling; so that by constant disturbance and pressure while serving a quantity by volume, the ice-cream content may become appreciably less in a short space of time. It is due to losses incurred through deterioration by varying temperatures, contact with foreign matter and diminution of "overrun" that possible ice-cream retailers have not handled the product and it is for such reasons that present retailers have not handled more than one flavour (usually vanilla) in such product.

In ice-cream storage chests and holders at present in use the operator to serve the product, removes the lid of the storage chest or holder with the result that the ice-cream or the like deteriorates quickly under the varying temperatures as well as being contaminated by the repeated insertion through the top of the holder of the operator's hands, arms and clothes, by foreign matter falling into the holder and by the breath of the operator coming in direct contact with the product while serving. Further, such storage chests and holders give the operator a considerable amount of laborious work in bending down while serving customers, such work necessitating the exposure of arms and hands to sudden changes of temperature for long periods to the detriment of the operator's health.

It is the object of the present invention to overcome these said difficulties and present to the customer a good, homogeneous and wholesome product uncontaminated and possessing the normal amount of "swell" or "overrun". A further object is to deliver ice-cream or the like in a predetermined quantity, with a clean cut, into a biscuit without the operator coming in contact with the bulk of the product while so doing. It is also a further object of this invention to provide means for the purpose set forth which can be readily dismantled for inspecting and cleaning.

To summarize, the main object is to withdraw a predetermined quantity of ice-cream or the like with a clean cut from a bulk quantity held in a serving or vending machine without opening the lid of the holder and thus without reducing (or practically so) the temperature within the holder.

The holding and serving machine made according to this invention comprises an insulated holder or container having a drawer or drawers, the interior thereof being kept at a low temperature; predetermined quantity ice-cream or the like delivering and cutting means; and ice-cream or the like biscuit holding valve or valves operable in said holder or container.

The invention will now be further described with reference to the accompanying drawings in which:—

Figure 1 is a side elevation partly in section of the holder or container with drawer, delivery and severing means, Figure 2 is a side elevation reduced in length of the delivery and cutting means manually operated, Figure 3 is a front elevation of Figure 2, Figure 4 is a cross section of Figure 2, showing the paper holders and the paper clip at the back, Figure 5 is a side elevation reduced in length of the delivery and cutting means arranged for operation by compressed air, and Figure 6 is the front elevation of Figure 5, Figure 7 is a plan of the ratchet and part of the rollers for moving the paper, while Figure 8 is an elevation view from inside the container of the biscuit holding and delivery valve, and Figure 9 is a detail in perspective of means for putting the delivering and severing means out of action, and Figure 10 is a perspective view of a biscuit designed to receive severed ice-cream.

Referring to Figure 1, a holder or container 1, is insulated in any suitable manner well known to the trade to minimize fluctuations in the temperature of the interior 2 thereof, said interior 2 being kept to approximately six degrees Fahr., by any well known refrigerative means. Situated in the inside bottom of the holder or container are rollers 3 and guides 4 to take a drawer 5, the guides 4 being provided with openings or vents 6 to allow free circulation of air about the drawer 5 when the latter is in place upon the rollers 3. The drawer 5 has a covered top with a slot 7 near the inner side of the wall of the holder or container, said slot 7 giving air access to the drawer 5 and a door 8 in the top giving access to the drawer 5 for use by an operator. A door 8 may be conveniently made in two halves and held together by a latch not shown, when closed. A shoulder or collar 9 is attached to the drawer 5 so that little more than the door 8 in the top is exposed when the drawer 5 is withdrawn. Slots 10, 11 one above the other are cut in and through the inner-end wall 14 of the drawer 5 to form valves when a flap 12 is hung over the outer face of the bottom slot 10 and when another flap 13 is hung over the inner face of the top slot 11 so that flap 12 opens outwardly of the drawer inner-end wall 14 through a pivoted lever 15 slidably attached to the outer flap 12 having pivoted connection with a pivoted bell crank lever 16 hinged at 16a to engage with a stop 17 attached to the bottom of the holder or container. When the drawer 5 is pushed right in the other flap 13 opens inwardly of the drawer 5 under the influence of passing air. When fully inserted in the holder or container 1, the drawer 5 does not reach to the end wall of the holder or container 1 but on the contrary, a substantial space exists between the end of the drawer 5 and the wall aforesaid, which space allows for the operation of the outer flap 12 aforesaid and said space may contain a reservoir 18 for holding a supply of compressed air to be utilized for purposes to be described.

The outside end of the drawer 5 has a handle 19 and said end may be inserted by the inclusion of an insulated door 20 in the wall in front of the drawer, said door being insulated and air tight when held close to the wall of the holder or container by a closure or clasp (not shown).

Any number of drawers can be incorporated in the holder or container according to requirements while provision can also be made for refrigerating coils and/or other cooling means within the holder or container.

The insulated top of the holder or container 1 is made with insulated doors or covers 21 hinged or wedged to the holder or container to give access to the delivering and cutting means held in the upper part of the holder or container 1 and to such other parts of the latter as may be necessary.

Situated preferably above the drawer 5 and supported upon brackets and legs 22a, is a predetermined quantity ice-cream or the like delivering and severing means, which according to this invention and illustrated in Figures 2 and 3, comprises a frame 22 considerably greater in length than breadth, having cross bars 23 and rollers 24 on which latter rides a conveyer 25, said conveyer 25 being operable by means according to the quantity of ice-cream required for delivery. The frame 22 has a delivery end which normally extends into a severing frame 26 in which latter the frame 22 is detachably secured by slots 27 engaging with inturned lugs or studs 28 attached to the severing frame 26. The severing frame 26 comprises a base and sides joined together by distance members and such said frame 26 contains and supports predetermining quantity regulating and delivering means and means for cutting or severing a predetermined quantity of ice-cream or the like from a supply brought forward by the conveyer 25 aforesaid.

The conveyer 25 is made of movable material such as grease-proof paper held in a roll 32 on a spool 33 held by spring 31 in slots 34 made in the top edge of the back end of the frame 22, said paper passing over the rollers 24 in the frame and back after use underneath the rollers 24 and between and over gripping rollers 35, see Figure 7, one of which has spikes 36 for gripping and pulling the paper. Thereafter the used paper passes to and is wound upon a used paper spool 37 supported between two axle ends 38, 39 contained in the back end of the frame 22. The used-paper spool 37 has a clutch comprising axle end 38 having spring 40 forcing a friction surface 41 of the spool 37 against a friction surface 42 on an axle end 39 which latter has a pinion 44 in mesh with a gear or toothed wheel 45 as hereinafter described so that the used paper conveyer 25, is taken up upon the used paper spool 37 and whereby provision is made for slip between said friction surfaces 41, 42 due to the varying diameters of the rolls of paper on the respective spools as the paper is used and to keep the latter taut as between the gripping rollers 35 and the used paper spool 37 to assist with the smooth running of the conveyer 25 and the winding of the latter on said spool 37. Means for feeding or moving the ice-cream conveyer comprises a conveyer connecting rod 46 pivoted to a front pawl carrier 47 and a connecting rod 48 pivoted to the front pawl carrier 47 and to a back pawl carrier 49 which ensures pawls 50, 51 pivoted to the carriers 47, 49 respectively operating simultaneously in actuating the paper conveyer 25. The pawl carriers 47, 49 are spring returned by spring 52 and the carriers 47, 49 are pivoted on spindles 53, 54 of their respective ratchet wheels 55, 56. The ratchet wheel 55 (see Figure 7) of the front pawl carrier 47 has toothed wheels 57 geared with pinion 58 of that one of the gripping rollers 35 having spikes 36 in the frame 22 for taking up used paper as aforesaid; while the ratchet wheel 56 of the back pawl carrier 49 has toothed wheel 45 geared through pinion 44 with the axle end 39 having the friction or clutch surface 42. The pawls 50, 51 pivoted respectively on carriers 47, 49 have springs 59, 60 which press said pawls into engagement respectively with the ratchet wheels 55, 56. The spindle 53 of the front ratchet wheel 55 forms a pivot for a shield or mask 61 passing over the teeth of the front ratchet wheel 55 so that the pawl 50 of the latter can be arranged to engage a desired tooth in said front ratchet wheel 55. By arranging the engagement of the pawl 50 as stated, the amount of movement imparted to the ratchet wheel 55 and through the toothed wheel 57 and the pinion 58 to the roller 35 with the spikes 36, is determined, and accordingly determines the amount of movement imparted to the conveyer 25 and to ice-cream or the like resting thereon for severing and delivery. Thus it can be arranged that the shield or mask 61 carries the pawl 50 of the front pawl carrier 47 over several teeth of the ratchet wheel 55 before passing beyond the shield or mask 61 to engage in a tooth to bring the conveyer 25 on the ice-cream thereon forward to deliver a small quantity of the latter; or such engagement can be made earlier by adjusting the shield or mask 61 away from the pawl 50 to bring about an earlier engagement of the latter with the ratchet wheel 55 to move the conveyer 25 and the ice-cream thereon forward a greater distance for the delivery of a larger quantity of the latter in accordance with the requirements of the operator. A similar shield or mask is not required for the back pawl carrier as the aforesaid friction surfaces 41 and 42 are adjusted by screw threaded nut 43 to slip upon each other. The shield or mask 61 is provided with a stud 62 to which is pivoted an operating rod 63 which is adjustable from the outside of the insulated holder or container.

The sides of the frame 22 adjacent the upper surface of the conveyer may be provided with guides such as vertical rollers (not shown) to keep the ice-cream or the like fairly upon the conveyer 25 and to guide the ice-cream squarely into the severing means in the severing frame 26 as hereinafter set forth.

Referring to Figures 2 and 3, the predetermined quantity delivering means and means for severing a predetermined quantity of ice-cream or the like is operated from outside the insulated holder or container 1 by an operating handle 65 keyed to a spindle 66, said handle having its movement limited by stops (not shown) attached to the holder or container 1. The spindle 66 is mounted beneath and across the severing frame 26 in downwardly extending bearings 66a and spindle 66 has keyed to it a segment 67 of a toothed wheel which latter engages with a pinion 68 mounted above the segment 67 in the severing frame 26 and having one or more short teeth 69 for re-engagement with the segment 67 of the toothed wheel. The pinion 68 is also in mesh with a toothed segmental end of an operating arm 70 pivotally mounted in the severing frame 26 above the pinion 68, the upper end of the operating arm 70 containing a spring pressed stud 71 for engagement in a hole 72 in the side of the severing frame 26 and operating arm 70 has pivotal connection with the connecting rod 46 of the pawl carrier 47 aforesaid. Also the spindle 66 has a severing arm 73 keyed to it, said severing arm 73 ending in jaws 74 through which a bolt 75 passes and is engaged in a lost motion slot 76 of a link 77 pivoted to a carrier 78 of a wire severer 79. The spindle 66 may pass to the other side of the severing frame 26 and the severing arm 73 and link 77 may be duplicated on that side of the severing frame 26.

The carrier 78 of the wire severer 79 is slidably held on posts or rods 80 attached to and held in side extensions of base and sides of the severing frame 26 and near the front of the latter, said posts 80 having racks 81 formed on the front faces thereof. Rotatably held in the carrier 78 and in mesh with the racks 81 are pinions 82 between which is stretched a severing wire 79 under adjustable tension spring 83, whereby the severing wire 79 is rotated when the carrier 78 is moved up and down and the pinions 82 pass along the racks 81. Attached to the jaws 74 and to the top of the severing frame 26 is a spring 84 to assist in the return of the carrier to the top of the said frame 26; and a further assistance in this connection is gained from a counterweight 85 attached to the back ends of weight levers 86 pivoted to the severing frame 26 and having the front ends pivotally attached to the said carrier 78.

To assist with the severing or cutting and the delivery of the cut off portion of ice-cream, a round rod 88 is mounted rotatably in slots 89 in the severing frame 26 and situated therein in front of the turnover of the grease proof paper conveyer 25 and approximately in the line of travel of the severing wire 79 aforesaid. Springs 90 preferably of leaf formation and attached at one end to the frame 26 and contacting by the other end fitting into a groove 91 in the rod 88, keep the latter under compression in the slots 89 in the frame.

The rod 88 has pinions 92 near each end by which it is turned as the pinions 92 engage teeth or racks 93, formed on the ends of bell crank levers 94 pivoted to the side of severing frame 26, which levers 94 are actuated by links 95 pivoted to said bell crank levers 94 and to the weight levers 86. The ends of the bell crank levers 94 having teeth or racks 93 as aforesaid, are preferably arcuate in formation, whereby the teeth or racks 93 in the end thereof not only rotate the rod 88 by engaging with its pinions 92 but also move said rod 88 against the springs 90 up the accommodating slots 89 in the frame 26. The rod 88 takes the downward pressure of the ice-cream or the like as the latter is severed by the descending and rotating wire 79 and assists in the ejection of the cut off portion of ice-cream as well as cleaning itself as in the case of the severing wire 79 as it revolves.

Alternative means for feeding the bulk ice-cream to the severing or cutting means, operating the latter and for delivering or assisting in the delivery of the severed portion thereof according to this invention is illustrated in Figures 5 and 6 and comprises compressed air utilized as follows:—

A pump (not shown) passes air under pressure through a non-return valve (not shown) to a reservoir 18 (see Figure 1) from which latter the compressed air is passed to a master valve 97 and in turn to a cylinder 98, a piston 99 in which is moved by the compressed air to propel the bulk ice-cream conveyer 25 and to uncover a port 100 leading to a cylinder 101, a piston 102 in which is moved by the compressed air admitted from the cylinder 98 to operate the ice-cream cutting means, and thereafter a port 121 is uncovered to discharge and direct the used compressed air through an exhaust pipe 128 and against a severed or "cut off" portion of ice-cream to assist in the tipping or ejection of same into a waiting biscuit or the like.

The master valve 97 comprises a cylinder or casing 105 having an inlet port 106 and an outlet port 107 and cylinder or casing 105 contains a mushroom valve 108 normally pressed against its seat 109 by spring 110 to close the inlet port 106 from communication with the outlet port 107. The mushroom valve 108 has a stud 111 supporting one end of the spring 110, the other end of the latter being accommodated upon and supported by an opposing stud 112 which latter is attached to and adjustable with cap 113 screw threaded into the end of the cylinder or casing 105 so that the gap between the stud 111 and stud 112 can be limited by turning the cap 113 in the cylinder or casing 105.

The cylinder or casing 105 accommodates a piston valve 114 which has a hole 115 drilled lengthwise to take stem 116 of the mushroom valve 108 (and said hole 115 also accommodates a compression spring 117. Further, the inner end of the piston valve 114 has a recess 118 and a screw thread in said recess 118 to take a leather packing 119 held against the cylinder wall by a wedge-shaped ferrel 120 screw-threaded butt-end first on to the recess 118 so that the inner portion of the leather packing 119 is free to be spread out against the cylinder wall under the pressure of the compressed air, to block the latter from access to an exhaust port 121 as hereinafter provided.

Upon an operating rod 122 extending externally of the container or holder 1 being pushed in, it contacts with the piston valve 114, and moves said valve 114 to cover the exhaust port 121 after which the spring 117 bears against the stem 116 to move the mushroom valve 108 from its seat until stud 111 contacts with stud 112, and communication is established between ports 106 and 107. Upon releasing the operating rod 122, the mushroom valve 108 is forced upon its seat 109 by spring 110 after which the piston valve 114 moves back to uncover the exhaust port 121 and communication is then established between outlet port 107 and exhaust port 121.

Thus by such arrangement, the master valve is operated to allow air under pressure to pass into the cylinder 98 to move the piston 99 therein and a piston rod 124 pivotally attached to connecting rod 46 by which the conveyer 25 is actuated as hereinbefore described. At the completion of its stroke the piston 99 uncovers a port 100 in cylinder 98 which then leads compressed air through pipe 100a to a cylinder 101 having a piston 102 and a piston rod 103 which latter is attached to the carrier 78 to operate the ice-cream cutting means as before described as the piston 102 is moved by the air pressure in cylinder 101. And at the completion of the stroke of the piston 102 which is the stroke of the carrier 78, the latter contacts with pivoted lever 142 to trip a lever 126 out of slot 127 in the rod 122 whereby as indicated, the supply of compressed air from inlet port 106 is stopped by mushroom valve 108 going back onto its seat 109 and outlet port 107 and exhaust port 121 are in communication whereby the air is forced back by the return of the carrier 78, through the exhaust port 121 from which it may be directed through exhaust pipe 128 onto the ice cream to assist in the tipping or ejecting as beforementioned.

Preferably the pistons in the said cylinders have heads which are provided with leather buckets to facilitate opening or uncovering the outlet ports in said cylinders.

A biscuit holding and delivering valve 129 (see Figure 1) is held in the front wall of the insulated container and in an inward and downward extension of the latter in front of the severing frame 26, and said valve is triangular in shape and is hinged to the wall preferably in a slot 143 so that it can be taken apart from the insulated container and so that in operation the valve itself blocks the easy passage of the air therethrough. The valve 129 has a wedge-shaped chock 130 to take a corresponding wedge-shaped indentation in a biscuit tray 131 and a number of the latter are provided with varying thicknesses or depths in accordance with the size of ice-cream or the like that is to be delivered to a correspondingly sized biscuit into which the severed ice-cream or the like falls from the conveyer 25 aforesaid. The front edges of the trays or studs 132 on the sides thereof, contact with a lever or pendulum 133 suspended from the container in front thereof and preferably to one side, and the lever or pendulum 133 is thus arranged to contact with the connecting rod 63 of the ratchet shield or mask 61. Thus according to the thickness of the tray inserted in the valve 129, the shield or mask 61 is moved against a spring 144 and over the teeth of the ratchet wheel 55 and the quantity of ice-cream to be delivered is determined. As indicated, the biscuit or other confection is shaped and held in the biscuit tray 131 to receive a severed portion of ice-cream corresponding to the cross sectional size of the ice-cream block on the conveyer and said severed portion is extracted from the machine while held in the biscuit.

The container or holder 1 is intended to hold ice-cream in bulk form of a shape and size to deliver in desired severed portions. Thus the delivering and severing means will require a recharging from the bulk supply held in the drawer or drawers 5 in the bottom of the container or holder 1. The bulk supply is kept wrapped in grease proof paper so that in re-charging as aforesaid, the operator does not come in personal contact with the product. In opening a drawer 5 for this purpose, the drawer as herein described, blocks the air outside the machine from being drawn into the holder or container 1 during such operation; the air required to take the place of the drawer being the air from the drawer itself displaced by outside air, such air again entering the drawer upon closing same and such air dispelling that temporarily admitted to the drawer from the outside as aforesaid.

So that in charging the conveyer 25 for operation, a drawer 5 containing the bulk stock is drawn out and a wrapped block of ice-cream of required flavour is withdrawn therefrom and the wrapping is removed from the block which is then placed on the conveyer 25 and pushed up to the severing wire, the lid is closed and the machine is ready for operation.

A bin of the hinged V type may be included or incorporated in the stand of the machine.

Means for putting the delivering and severing means out of action and locking same when the supply of ice-cream is depleted comprises a pivotally suspended lever 134 which has a spring 145 and which normally engages and retains a pivoted catch or latch 135 out of the path of travel of the operating push rod 122, but upon the state at which it is desired the said delivering and severing means should be reloaded or for any reason rendered inoperative, a back stop 136 on the paper conveyer 25 engages a projection 137 from said lever 134 and moves same so that it frees the pivoted catch or latch 135, allowing the latter to fall and engage in a recess or groove 146 in the operating rod 122 and locks the latter and the apparatus against use.

The back stop 136 comprises spring pressed paper clips 138 acting against a base 139 which latter is provided with side flanges 140 for retaining the stop 136 upon the upper edges of the conveyer frame 22. A downturned lug 141 projecting towards the front of the said means is arranged to engage the projection 137 from the lever 134.

Further also referring to Figure 10 the biscuit or other confection for receiving the severed portion of ice-cream can conveniently be made of biscuit in the form of a tray or a shallow container with end walls 147 and a side or back wall 148, or the walls may be in the form of projections or lugs for retaining the severed portion of ice-cream therein and said biscuit or other confection can have an upper surface with grooves or recesses 149 in its bottom 150 with cross stays 151 between the side walls 148 and the bottom 150 to strengthen the biscuit and assist in retaining the ice-cream thereon as aforesaid.

Also the biscuit or other confection can have filleted or bracketed portions to add further strength to same, said portions at the same time facilitating the gripping of the biscuit or confection between the thumb and fingers when being handled for either loading or unloading.

What I do claim and desire to obtain by Letters Patent of the United States of America is:—

1. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means comprising a conveyer frame, a conveyer movable over said frame toward the severing means, a supply spool for said conveyer rotatably mounted on said frame, and a waste paper spool rotatably mounted beneath said frame and operatively connected to said common driving means for winding the paper conveyer about said spool after the latter has delivered the ice cream to said severing means.

2. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means comprising a conveyer frame, a conveyer movable over said frame toward the severing means, a supply spool for said conveyer rotatably mounted on said frame, and a waste paper spool rotatably mounted beneath said frame and operatively connected to said common driving means for winding the paper conveyer about said spool after the latter has delivered the ice cream to said severing means, both of said spools being arranged in substantially vertical alignment at a point on the frame remote from the severing means.

3. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means including a conveyer frame, a paper conveyer movable over said frame toward the severing means, a supply spool for said conveyer rotatably mounted on said frame, a waste paper spool rotatably mounted beneath said frame, gripping rollers rotatably mounted beneath said frame and adapted to grip said conveyer for moving the latter toward said waste paper spool, and means operatively connecting said rollers and said waste paper spool to the common driving means whereby said rollers and said waste paper spool will be driven in unison.

4. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means including a conveyer frame, a paper conveyer movable over said frame toward the severing means, a supply spool for said conveyer rotatably mounted on said frame, a waste paper spool rotatably mounted beneath said frame, a ratchet wheel secured to said waste paper spool, a pawl pivotally mounted on said frame and adapted to engage the teeth of said ratchet wheel for driving said waste paper spool, and means connecting said pawl to said common driving means for actuating said pawl.

5. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means including a conveyer frame, a conveyer belt movable over said frame toward the severing means, a supply spool for said conveyer rotatably mounted on said frame, a second spool rotatably mounted beneath said frame for winding the conveyer belt thereabout after the latter has delivered ice cream to the severing means, and means operatively connecting said second spool to said common driving means for rotating said second spool.

6. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means including a conveyer frame, a conveyer belt movable over said frame toward the severing means, a supply spool for said conveyer rotatably mounted on said frame, a second spool rotatably mounted beneath said frame for winding the conveyer belt thereabout after the latter has delivered ice cream to the severing means, a ratchet wheel, a gear operatively connected to said ratchet wheel and said second spool for driving the latter, a friction clutch arranged between said second spool and said gear, and means operatively connecting said ratchet wheel to said common driving means for rotating the latter.

7. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means including a conveyer frame, a conveyer belt movable over said frame toward the severing means, a supply spool for said conveyer rotatably mounted on said frame for feeding the belt over said frame, a second spool rotatably mounted beneath said frame for winding the conveyer belt thereabout after the latter has delivered ice cream to the severing means, gripping rollers rotatably mounted beneath said frame and arranged in the path of movement of said conveyer belt, said rollers being adapted to grip said belt as it moves toward the second spool, a ratchet wheel operatively connected to said rollers for rotating the latter, a second ratchet wheel operatively connected to said second spool for rotating said spool, a pair of pawls pivotally mounted on said frame and adapted to engage the teeth of said ratchet wheels for driving said rollers and said second spool, and means connecting said pair of pawls to said common driving means for actuating said pawls in unison.

8. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means including a conveyer frame, a conveyer belt movable over said frame toward the severing means, a supply spool for said conveyer rotatably mounted on said frame for feeding the belt over said frame, a second spool rotatably mounted beneath said frame for winding the conveyer belt thereabout after the latter has delivered ice cream to the severing means, gripping rollers rotatably mounted beneath said frame and arranged in the path of movement of said conveyer belt, said rollers being adapted to grip said belt as it moves toward the second spool, a ratchet wheel operatively connected to said rollers for rotating the latter, a second ratchet wheel operatively connected to said second spool for rotating said spool, a pair of pawls pivotally mounted on said frame and adapted to engage the teeth of said ratchet wheels for driving said rollers and said second spool, means connecting said pair of pawls to said common driving means for actuating said pawls in unison, and a friction clutch arranged between second pawl and said second ratchet wheel.

9. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said supporting and feeding means including a conveyer frame, a conveyer belt movable over said frame toward the severing means, a supply spool for said conveyer rotatably mounted on and at one end of said frame, a second spool rotatably mounted beneath and at the same end of said frame for winding the conveyer belt thereabout after the latter has delivered ice cream to the severing means, spaced gripping rollers rotatably mounted beneath said frame between said second spool and said severing means, a spindle journaled in said frame adjacent said rollers, a ratchet wheel keyed to said spindle, a toothed wheel keyed to said spindle and adapted to be driven by said ratchet wheel, gears fixed to said rollers and meshing with said toothed wheel, said rollers being arranged in the path of movement of said conveyer belt and spaced to receive the belt therebetween, and means connecting said second spool and said ratchet wheel with said common driving means for rotating said ratchet wheel and second spool in unison.

10. An ice cream cutting and delivering device of the character described, comprising a container, means for severing a portion of the ice cream, a conveyer frame arranged in said container and terminating adjacent said severing means, a conveyer belt movable over said frame toward said severing means for conveying ice cream thereto, gripping rollers rotatably mounted on said frame and engaging said conveyer belt, a shaft journaled in said frame, adjacent said rollers, a ratchet wheel keyed to said shaft and operatively connected to said rollers for rotating the latter, and thereby advancing the belt toward the severing means, a pawl pivotally mounted on said frame and adapted to engage the teeth of said ratchet wheel for actuating the latter, means connecting said pawl with said common driving means, means cooperating with said pawl for varying the extent of movement of the belt for regulating the quantity of ice cream to be severed by the severing means, said last mentioned means including a shield rotatably mounted on said shaft and movable into and out of the path of movement of said pawl.

11. An ice cream cutting and delivering device of the character described, comprising a container, means for severing a portion of the ice cream, a conveyer frame arranged in said container and terminating adjacent said severing means, a conveyer belt movable over said frame toward said severing means, for conveying ice cream thereto, gripping rollers rotatably mounted on said frame and engaging said conveyer belt, a shaft journaled in said frame adjacent said rollers, a ratchet wheel keyed to said shaft and operatively connected to said rollers for rotating the latter and thereby advancing the belt toward the severing means, a pawl pivotally mounted on said frame and adapted to engage the teeth of said ratchet wheel for actuating the latter, means connecting said pawl with said common driving means, means cooperating with said pawl for varying the extent of movement of the belt for regulating the quantity of ice cream to be severed by the severing means, said last mentioned means including a shield, and means for moving said shield into and out of the path of movement of said pawl.

12. An ice cream cutting and delivering device of the character described, comprising a container, means for severing a portion of the ice cream, a conveyer frame arranged in said container and terminating adjacent said severing means, a conveyer belt movable over said frame toward said severing means for conveying ice cream thereto, gripping rollers rotatably mounted on said frame and engaging said conveyer belt, a shaft journaled in said frame, adjacent said rollers, a ratchet wheel keyed to said shaft and operatively connected to said rollers for rotating the latter and thereby advancing the belt toward the severing means, a pawl pivotally mounted on said frame and adapted to engage the teeth of said ratchet wheel for actuating the latter, means connecting said pawl with said common driving means, means cooperating with said pawl for varying the extent of movement of the belt for regulating the quantity of ice cream to be severed by the severing means, said last mentioned means including a shield rotatably mounted on said shaft and adapted to cover a toothed portion of the ratchet wheel, and means extending through a wall of the container for moving said shield away from said toothed portion to permit the pawl to engage the latter.

13. An ice cream cutting and delivering device, comprising a container for said ice cream, means for severing a portion of the ice cream, means for supporting and feeding said ice cream toward the severing means, driving means common to the severing means and the feeding means, means for selectively varying the extent of movement of the feeding means for regulating the quantity of ice cream to be severed, said severing means including a frame, a cutting element secured to said frame and adapted for vertical reciprocation therein, said cutting element being arranged adjacent one end of said supporting and feeding means and extending crosswise thereof, means for reciprocating said cutting element, and means on said frame for rotating said cutting element as it reciprocates.

14. An ice cream cutting and delivering device, comprising a container for said ice cream, means for severing a portion of the ice cream, means for supporting and feeding said ice cream toward the severing means, driving means common to the severing means and the feeding means, and means for selectively varying the extent of movement of the feeding means for regulating the quantity of ice cream to be severed, said severing means including a pair of spaced vertical rack bars arranged at one end of said supporting and feeding means, a carrier frame slidably mounted on said rack bars, pinions rotatably mounted in said frame and meshing with the teeth in said bars, a cutting element extending between said bars, having its ends secured to said pinions and rotatable with the latter, and means connecting said frame to said common driving means for reciprocating the latter on said bars.

15. An ice cream cutting and delivering device, comprising a container for said ice cream, means for severing a portion of the ice cream, means for supporting and feeding said ice cream toward the severing means, driving means common to the severing means and the feeding means, and means for selectively varying the extent of movement of the feeding means for regulating the quantity of ice cream to be severed, said severing means including a pair of spaced vertical rack bars arranged at the delivery end of said supporting and feeding means, a carrier frame slidably mounted on said rack bars, pinions rotatably mounted in said frame and meshing with the teeth in said bars, a wire extending between said bars, having its ends secured to said pinions and rotatable with the latter, means on said frame for maintaining said wire taut, and means connecting said frame to said common driving means for reciprocating the latter on said bars.

16. An ice cream cutting and delivering device, comprising a container for said ice cream, means for severing a portion of the ice cream, means for supporting and feeding said ice cream toward the severing means, driving means common to the severing means and the feeding means, and means for selectively varying the extent of movement of the feeding means for regulating the quantity of ice cream to be severed, said severing means including a stationary side plate arranged in front of and adjacent each side of the delivery end of said supporting and feeding means, a vertical rack bar spaced outwardly from said side plates, a carrier frame slidably mounted on said rack bars, pinions rotatably mounted in said frame and meshing with the teeth in said bars, a wire extending between said bars, said wire having its ends secured to said pinions and rotatable therewith, each of said side plates having a slot in its upper surface, a rod rotatably mounted in said slots, extending across the delivery end of said supporting and feeding means, and in vertical alignment with said wire, means normally holding said rod in said slots, means connecting said carrier frame with said common driving means for reciprocating the frame on said bars, and means engageable with said rod and connected to said common driving means for rotating said rod and raising the latter toward said wire while the latter is moving downwardly toward the supporting and feeding means.

17. An ice cream cutting and delivering device of the character described, comprising a container, a conveyer for feeding said ice cream toward the front end of the container, means arranged adjacent the front end of said conveyer for severing a portion of the ice cream after the latter has been fed forward by said conveyer, and means for regulating the forward movement of said conveyer, said last mentioned means including a tray adapted to receive the severed portion of the ice cream.

18. An ice cream cutting and delivering device of the character described, comprising a container for said ice cream, means including a frame and a cutting element mounted for reciprocation within said frame for severing a portion of the ice cream, means including a conveyer frame and a conveyer belt movably mounted thereon for supporting and feeding said ice cream toward the severing means, driving means common to the severing means and the feeding means, and means for selectively varying the extent of movement of the feeding means for regulating the quantity of ice cream to be severed, said driving means including a hand lever pivotally mounted on said severing frame and arranged on the exterior of said container, a gear segment operatively connected to said lever and adapted to be actuated thereby, a second gear segment pivotally mounted on the conveyer frame and operatively connected to said conveyer belt for actuating the latter, a gear interposed between said segments and meshing with the teeth thereof for imparting movement of one segment to the other, a link having one of its ends fixed to said hand lever, and means connecting the opposite end of said link to said cutting element for reciprocating the latter upon actuation of said hand lever.

19. In combination an ice cream support, a cutting wire, a support for said cutting wire, one of said supports being movable relatively to the other, and means for imparting rotary movement to said wire during relative movement of said supports.

HARRY SANDLANT.